United States Patent [19]

Chiang et al.

[11] Patent Number: 5,151,478

[45] Date of Patent: Sep. 29, 1992

[54] HIGHLY CONDUCTING ORGANIC POLYMER THIN FILM COATINGS

[75] Inventors: Long Y. Chiang, Somerset; Wen-Yih F. Lai, Fair Lawn, both of N.J.

[73] Assignee: Exxon Research and Engineering Company, Florham Park, N.J.

[21] Appl. No.: 745,298

[22] Filed: Aug. 15, 1991

[51] Int. Cl.[5] .................. C08F 126/06; C08F 132/08; C08G 73/06

[52] U.S. Cl. ................... 526/258; 526/259; 526/265; 526/280; 528/423

[58] Field of Search ................ 526/259, 265, 258, 280

[56] References Cited

U.S. PATENT DOCUMENTS 4,833,232  5/1989  Chiang ................. 528/423

Primary Examiner—Joseph L. Schofer
Assistant Examiner—Wu C. Cheng
Attorney, Agent, or Firm—Joseph J. Dvorak

[57] ABSTRACT

According to the present invention, there is provided a novel class of conducting organic polymers that are formed by the vapor phase polymerization and condensation of polynuclear aromatic compounds, polynuclear heterocyclic compounds and oligomers of polynuclear heterocyclic compounds. Especially useful in forming the conducting organic polymers of the present invention are compounds selected from the group consisting of anthracene, pyrene, pentacene, perylene, triphenylene, quinoline, phenazine, biquinoline, quinoline oligomers, benzoquinoline, pyrido-bipyrazine, terpyridine, bipyrazine and alkyl derivatives thereof in which the alkyl subsituent has 1 to about 10 carbon atoms.

4 Claims, 1 Drawing Sheet

TEMPERATURE DEPENDENT RESISTIVITIES
OF PYROLYTIC POLYQUINOLINE FILMS

HIGHLY CONDUCTING ORGANIC POLYMER THIN FILM COATINGS

FIELD OF THE INVENTION

This invention relates to new organic conducting polymers formed by vapor phase polymerization and deposition of certain polyaromatic compounds including heteroaromatic compounds and oligomers thereof.

BACKGROUND OF THE INVENTION

There are wide varieties of organic conducting polymers known in the art. Polyacetylene and polyxylene represent two well known examples of conducting organic polymers The myriad of conducting polymers known in the art have been prepared by numerous techniques, including condensation polymerization, free radical polymerization and vapor phase polymerization and deposition. For example, polyxylene is typically prepared by vapor phase polymerization of xylene at relatively low temperatures and without the need for unusually high vacuum conditions.

Among the disadvantages of the known conducting organic polymers is their relatively poor thermal and environmental stability. Hence, there remains a need for organic conducting polymers that have improved thermal and environmental stability.

SUMMARY OF THE INVENTION

According to the present invention, there is provided a novel class of conducting organic polymers that are formed by the vapor phase polymerization and condensation of polynuclear aromatic compounds, polynuclear heterocyclic compounds and oligomers of polynuclear heterocyclic compounds. Especially useful in forming the conducting organic polymers of the present invention are compounds selected from the group consisting of anthracene, pyrene, pentacene, perylene, triphenylene, quinoline, phenazine, biquinoline, quinoline oligomers, benzoquinoline, pyrido-bipyrazine, terpyridine, bipyrazine and alkyl derivatives thereof in which the alkyl substituent has 1 to about 10 carbon atoms.

To form the novel polymers of the present invention, one of the aforementioned polynuclear aromatic compounds, polynuclear heterocyclic compounds or oligomers thereof is vaporized at temperatures in the range of about 700° C. to about 1200° C. at pressures ranging from about 0 5 to 2.0 torr., in the presence of a substrate whereby the aforementioned compound undergoes polymerization and is deposited on the substrate in the form of a conductive polymeric film.

The polymers of the present invention are thermally stable at ambient conditions up to 1200° C. and display conductivities in the range of 100 to 900 $(\Omega cm)^{-1}$ at room temperature without doping and, consequently, can be used in electronic devices, such as field effect transistors, diodes and the like. For example, the polymers of the present invention are useful as electric conductors when deposited on semiconductors. Additionally, they can be doped with typical doping agents, such as $AsF_5$, after deposition on a semiconductor, thereby providing a heterojunction for photovoltaic devices and the like. Indeed, when the polymers of the present invention are deposited on glass substrate, they form a mirror-like finish and, consequently, can be so deposited to form decorative layers.

These and other features of the present invention will become more readily apparent upon a reading of the "Detailed Description of the Invention" in conjunction with the drawings.

DETAILED DESCRIPTION OF THE INVENTION

The polymers of the present invention are formed by vapor phase polymerization of polynuclear aromatic compounds, polynuclear heterocyclic compounds and oligomers of polynuclear heterocyclic compounds. Thus, a wide range of polynuclear aromatic, polynuclear heterocyclic and oligomeric compounds may be used. The preferred polynuclear aromatic and heterocyclic compounds suitable in forming the polymers of the present invention are selected from the group consisting of anthracene, pyrene, pentacene, perylene, triphenylene, quinoline, phenazine, biquinoline, quinoline oligomers, benzoquinoline, pyrido-bipyrazine, terpyridine, bipyrazine and substituted alkyl derivatives thereof in which the alkyl groups have from 1 to about 10 carbon atoms.

The preferred oligomer useful in the present invention is represented by the following formula:

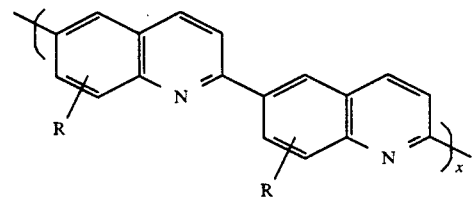

in which R is hydrogen or an alkyl group having from 1 to about 10 carbon atoms and x is a number representing the extent of polymerization and, therefore, is greater than 1 and typically is in the range of from about 3 to about 10.

The polymers of the present invention are prepared by vaporizing the foregoing compounds at temperatures in the range of about 700° C. to about 1200° C. and at pressures ranging from about 0.5 to about 2 torr. in the presence of a substrate whereby the vaporized compound undergoes polymerization and deposition on the substrate.

From the foregoing, it should be apparent that the substrate used is one which is stable under the temperature and pressure conditions existing during the vapor phase polymerization of the precursor compound.

Figure 1:
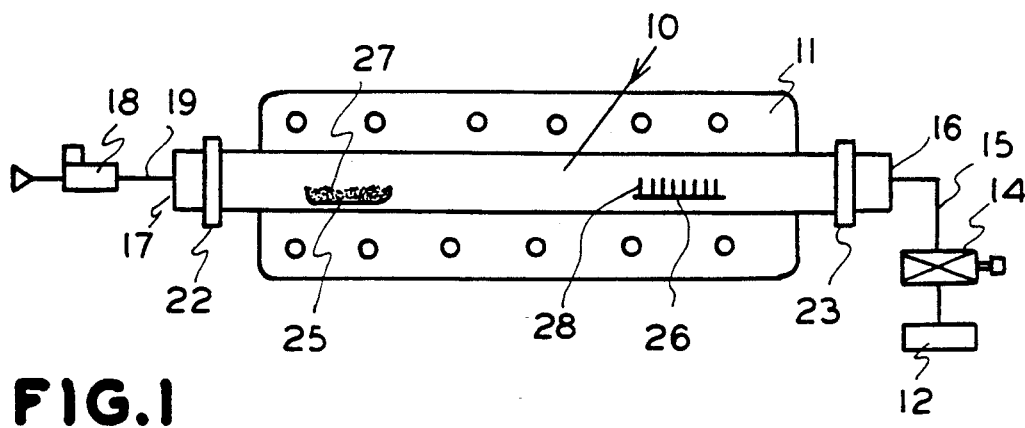
FIG. 1 is a schematic illustration of an apparatus that is suitable in preparing the polymers of the present invention.
Figure 2:
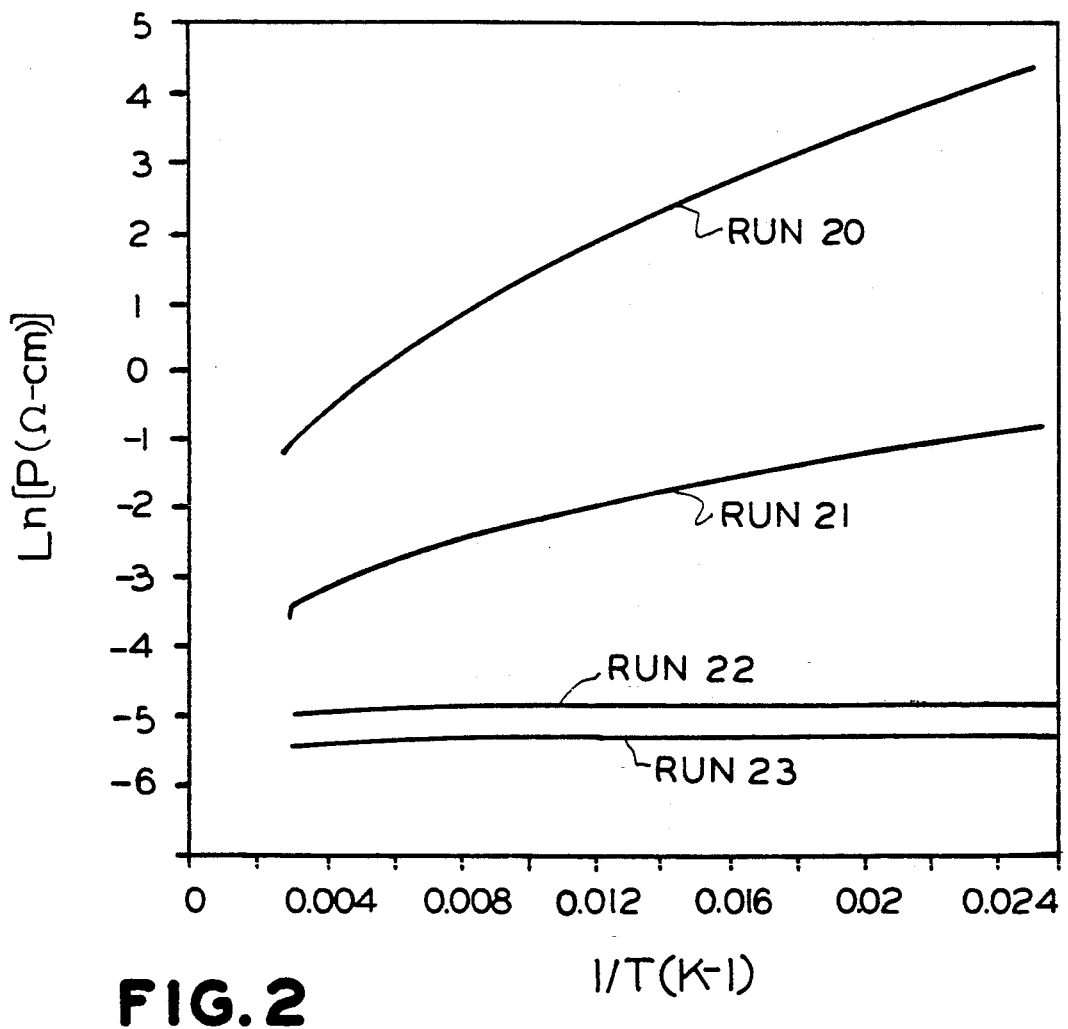
FIG. 2 is a graph showing the temperature dependent resistivities of various polymeric film formed from the vapor phase polymerization and deposition of various polyquinoline oligomers in accordance with the practice of the present invention.

A suitable apparatus for carrying out the vapor phase polymerization and deposition of the polymers of the present invention is shown schematically in FIG. 1. As is shown in FIG. 1, a high temperature cylindrical reactor vessel 10, such as a quartz tube, is provided with an electric furnace 11, or other suitable heating means, for heating the contents within the vessel 10. The vessel 10 is equipped with a mechanical pump 12 and an exhaust throttle valve 14 which communicates via line 15 with the outlet end 16 of the vessel 10. Vessel 10 also has an inlet end 17 and a mass flow controller 18 which communicates via line 19 with the inlet end 17 of the vessel 10. The mass flow controller 18 is supplied via line 19 with an inert gas, preferably argon, from an inert gas source (not shown). The reactor vessel 10 is provided with vacuum type coupling means 22 and 23 at the inlet and outlet ends 17 and 16, respectively, which permit placing the polyaromatic, heterocyclic or oligomeric precursor compounds and the substrate into the vessel 10 and for removal of the deposited polymer after the reaction is complete.

As is shown in FIG. 1, the polymer precursor 27 is placed in the vessel 10 in a boat or similar device 25 and the substrate 28 is mounted in an appropriate rack 27 at a distance downstream from the precursor. Furnace heating control means (not shown) were provided to permit regulation of the temperature throughout the vessel 10. As indicated, an inert gas, namely argon, is introduced into the reaction vessel 10 via the mass flow controller 18. The purpose of the introduction of the inert gas is to control the overall system pressure during the vaporization and polymerization of the polymer precursor.

Utilizing the foregoing furnace, the vaporization and polymerization of a number of compounds was investigated. The compounds polymerized and reaction conditions used are given in Table 1. Also shown in Table 1 are the conductivities of the various polymer films formed.

or platinum wires to the film on the substrate with silver paint.

In the runs shown in Table 1, the quinoline oligomer used in Runs 1 to 7 was synthesized by the catalytic dehydrogenative polymerization reaction of 1,2,3,4-tetrahydroquinoline in the presence of a transition metal sulfide catalyst, as is described in U.S. Pat. No. 4,727,135. The specific polyquinoline oligomer employed in these runs was a methylene chloride soluble, diethylether insoluble fraction which had a vaporization temperature starting at 380° C., as determined by thermogravimetric analysis (TGA). The compounds used in Runs 8 to 18 were commercially available compounds.

In general, for reaction temperatures of below about 800° C., the resultant polymer tended to have lower conductivity than those formed at temperatures above about 800° C.

A series of runs were conducted, in which a quinoline oligomer was polymerized at various temperature conditions. In each of these runs, the polymerization was conducted in a sealed evacuated quartz tube at the temperature shown in Table 2, below, for a period of one hour.

TABLE 2

| Run | Reaction Temperature | Product Formula | H/C Ratio | Wt. Loss (%) |
| --- | --- | --- | --- | --- |
| 19 | 600 | $C_9H_{4.2}N_{1.0}$ | 0.47 | <10 |
| 20 | 700 | $C_9H_{3.0}N_{0.9}$ | 0.33 | 14 |
| 21 | 800 | $C_9H_{1.2}N_{0.5}$ | 0.13 | 19 |
| 22 | 900 | $C_9H_{1.0}N_{0.5}$ | 0.11 | 19 |
| 23 | 1000 | $C_9H_{0.8}N_{0.5}$ | 0.09 | 23 |
| 24 | 1200 | $C_9H_{0.3}N_{0.5}$ | 0.03 | 22 |

TABLE 1

| Run | Compound | N/C Ratio | Temperature (Tp, °C.) | Pressure (torr) | Coating Time (hr.) | Conductivity $\sigma RT$ (S/cm) |
| --- | --- | --- | --- | --- | --- | --- |
| 1 | Quinoline Oligomer | 0.11 | 600 | | | $10^{-3}$ |
| 2 | Quinoline Oligomer | 0.11 | 700 | | | 10 |
| 3 | Quinoline Oligomer | 0.11 | 800 | 0.5 | 3.0 | 100 |
| 4 | Quinoline Oligomer | 0.11 | 900 | 0.2 | 1.0 | 250 |
| 5 | Quinoline Oligomer | 0.11 | 900 | 0.2 | 3.0 | 590 |
| 6 | Quinoline Oligomer | 0.11 | 900 | 0.5 | 1.0 | 750 |
| 7 | Quinoline Oligomer | 0.11 | 1050 | 0.5 | 3.5 | 860 |
| 8 | Anthracene | 0.0 | 900 | 0.5 | 2.0 | 690 |
| 9 | Pentacene | 0.0 | 900 | 0.5 | 2.0 | 460 |
| 10 | Perylene | 0.0 | 900 | 0.5 | 2.0 | 370 |
| 11 | Pyrene | 0.0 | 900 | 0.5 | 2.0 | 500 |
| 12 | Triphenylene | 0.0 | 900 | 0.5 | 2.0 | 540 |
| 13 | 7,8-Biquinoline | 0.08 | 900 | 0.5 | 2.0 | 690 |
| 14 | Phenanthridine | 0.08 | 900 | 0.5 | 2.0 | 610 |
| 15 | Phenazine | 0.17 | 900 | 0.5 | 2.0 | 310 |
| 16 | 2,2'-6',2''-Terpyridine | 0.2 | 900 | 0.5 | 2.0 | 520 |
| 17 | Pyrido[2,3-b]pyrazine | 0.43 | 900 | 0.5 | 2.0 | 510 |
| 18 | 2,2'-Bipyrazine | 0.5 | 900 | 0.5 | 2.0 | 295 |

Under the conditions employed and as shown in Table 1, highly cross-linked polymers were formed and deposited on the surface of the substrates. In the many examples that were conducted, quartz was the typical substrate employed. The thickness of the polymeric film deposited varied within the range of 50Å to 2000Å, depending upon the pressure in the reactor and the length of time at which the reaction was conducted. In all cases, the thickness of the film was measured either by a profilometer or by studies of the Secondary Ion Mass Spectrometry (SIMS) and the Scanning Electron Microscopy (SEM).

The room temperature conductivity of the resultant film was measured in terms of sheet resistivities using an in-line four-point-probe technique. The temperature dependence of the conductivity was studied from 1.2 k to 800 k at −271.8° C. to 527° C. by attaching four gold The polymeric products of these polymerizations were characterized by various spectroscopic methods. For example, infrared spectra of the various products showed disappearance of virtually all bands that bore a close resemblance to the infrared spectra of most other types of pyropolymers. The solid state $^{13}$CNMR spectrum of Run 19 gave a broad peak centered at 122 ppm, which is 3 ppm lower than that observed for quinoline oligomers. In the case of Run 22 and Run 24, the peak became broader and the center peak systematically shifted towards 108 ppm indicating an increased degree of condensation and loss of nitrogen. The NMR and elemental analysis results agree with the proposed cross-linked polyquinoline structure for the thermal products resulting from the original linear polyquinoline line chain. UV-visible spectra of the product films showed a very broad absorption with a tail covering virtually the entire range of UV and visible frequencies. It further revealed a highly extended aromatic nature of the product with a continuous energy band structure.

Scanning electron micrographs (SEM) of the film product of Run 22 showed a very smooth surface with a densely packed mass without any filament type of morphology. Transmission electron micrographs (TEM) of this film showed an amorphous structureless appearance without any obvious features of a graphitic layer structure. This was confirmed by a powder X-ray diffraction study, indicating only very weak and diffuse peaks centered at 3.56Å, which was observed in a sample of the product of Run 19. The center of this peak position shifts toward 3.35Å and the width becomes narrower for the product of Run 24, indicating an increased ordering in going from the reaction temperature of 700° C. to 1200° C.

The room temperature conductivities of the films (200-800 nm) of Runs 19 to 24 were found to be 10, 60, 400, 410 and 450$(\Omega cm)^{-1}$, respectively. The pressure dependent conductivity study at 900° C. indicates an optimum pressure of 0.5 torr. being used to obtain maximum conductivity. The room temperature conductivities of the polymer film prepared from the compounds used in Runs 8, 13, 16 and 17 at 900° C. are found to be 690, 690, 240 and 510 S/cm, respectively. These data show consistent trend in the N/C ratio dependent conductivity.

What is claimed is:

1. A polymer formed by vaporizing a compound selected from the group consisting of anthracene, pyrene, pentacene, phenazine, pyrido-bipyrazine, terpyridine, bipyrazine and alkyl derivatives thereof in which the alkyl group has from 1 to about 10 carbon atoms said vaporizing being conducted in the presence of a substrate at temperatures and pressures and for a time sufficient to promote the polymerization of the compound and the deposition of the formed polymer on the substrate.

2. A polymer formed by vaporizing a compound selected from the group consisting of anthracene, pyrene, pentacent, phenazine, pyrido-bipyrazine, terpyridine, bipyrazine and alkyl derivatives thereof in which the alkyl group has from 1 to about 10 carbon atoms, said vaporizing being conducted at temperatures in the range of from about 700° C. to about 1200° C. and at pressures of from about 0.5 to about 2 torr. and in the presence of a substrate for a time sufficient for the polymer to form on the substrate.

3. A method of forming a polymer on a substrate comprising: vaporizing a compound selected from the group consisting of polynuclear aromatic compounds and polynuclear heterocyclic compounds, the vaporizing being conducted in the presence of a substrate at temperatures and pressures and for a time sufficient to promote the vapor polymerization of the compound and the deposition of formed polymer on the substrate.

4. The method of claim 3 wherein the compound is vaporized at temperatures in the range of from about 700° C. to about 1200° C. and at pressures of from about 0.5 to about 2 torr.